United States Patent
Yuen et al.

(10) Patent No.: US 10,739,124 B2
(45) Date of Patent: Aug. 11, 2020

(54) PENDULUM-BASED LASER LEVELING DEVICE WITH CALIBRATION GUARD FUNCTION

(71) Applicant: Robert Bosch GmbH, Stuttgart (DE)

(72) Inventors: Hung-Ying Yuen, Hong Kong (CN); Louis Chan, Hong Kong (CN); Thomas Kohlert, Baden-Wuerttemberg (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 16/028,753

(22) Filed: Jul. 6, 2018

(65) Prior Publication Data
US 2019/0011246 A1    Jan. 10, 2019

(30) Foreign Application Priority Data
Jul. 6, 2017    (CN) .......................... 2017 1 0545712

(51) Int. Cl.
*G01C 15/02*    (2006.01)
*G01B 7/30*    (2006.01)
*G01C 15/00*    (2006.01)
*G01C 9/06*    (2006.01)
*G01C 9/12*    (2006.01)

(52) U.S. Cl.
CPC ................. *G01B 7/30* (2013.01); *G01C 9/06* (2013.01); *G01C 9/12* (2013.01); *G01C 15/004* (2013.01); *G01C 2009/066* (2013.01)

(58) Field of Classification Search
CPC ........... G01B 7/30; G01B 9/06; G01C 15/004
USPC .......................................................... 33/290
See application file for complete search history.

(56) References Cited

U.S. PATENT DOCUMENTS

| | | | | |
|---|---|---|---|---|
| 4,993,161 A | * | 2/1991 | Borkovitz | G01C 15/004 33/291 |
| 5,907,907 A | * | 6/1999 | Ohtomo | G01C 15/004 33/281 |
| 2011/0030230 A1 | * | 2/2011 | Fuchs | G01C 15/004 33/283 |
| 2014/0182147 A1 | | 7/2014 | Munroe et al. | |
| 2014/0237833 A1 | * | 8/2014 | Schubert | G01C 9/10 33/365 |
| 2015/0354942 A1 | * | 12/2015 | Bridges | G01B 11/14 33/503 |
| 2016/0377428 A1 | * | 12/2016 | Schubert | G01C 15/004 33/366.11 |

FOREIGN PATENT DOCUMENTS

DE    10 2013 217 479 A1    3/2015

\* cited by examiner

*Primary Examiner* — George B Bennett
(74) *Attorney, Agent, or Firm* — Maginot, Moore & Beck LLP

(57) ABSTRACT

A pendulum-based laser leveling device comprises a micro controller unit connected to a shock sensor for sensing a shock experienced by the laser leveling device. The micro controller unit is configured to send out a warning message when the magnitude of the shock sensed by the shock sensor exceeds a shock threshold.

12 Claims, 2 Drawing Sheets

PENDULUM-BASED LASER LEVELING DEVICE WITH CALIBRATION GUARD FUNCTION

BACKGROUND OF THE INVENTION

The disclosure relates to a pendulum-based laser leveling device with calibration guard function, which is able to warn the user when the device requires attention after certain event has happened.

Pendulum-based laser leveling devices are generally used in construction and other fields. Such a laser leveling device may comprise one or more laser diodes carried by a pendulum for generating laser lines. Laser leveling devices are precise and sensitive. The device may not be accurate when it experiences impact forces. However, a laser leveling device is always handled roughly in construction sites and is shared with different users. When the device has subjected to a strong shock, it may need to be checked or calibrated. However, it is not able to tell if the device has been handled properly when a user start the job with the device, so the user may use the device to work at a low precision. Further, a laser leveling device does not work properly under extreme working conditions, like extreme temperatures. For example, the laser diodes each have a permitted operation temperature range. Operation performance and lifetime will be affected if the device works at a temperature beyond the permitted operation temperature range. Thus, it is desired that the user can be warned before usage if some undesirable events had happened to the device or the working temperature is not proper.

Some existing laser leveling devices warn the user through icons on a device LED panel about an abnormal state. However, icons on an LED panel can provide only very limited information, and cannot provide enough information to warn the user that the device may not be in proper condition.

SUMMARY OF THE INVENTION

An object of the disclosure is provide a pendulum-based laser leveling device with calibration guard function for clearly warning the user that the device has experienced an undesirable event.

For this end, there provides a laser leveling device which comprises:

a shock sensor for sensing a shock that the laser leveling device is experienced; and a micro controller unit (MCU) connected to the shock sensor;

wherein the MCU is configured to send out a warning message when the magnitude a shock sensed by the shock sensor exceeds a shock threshold.

According to a possible embodiment, the laser leveling device further comprise a human machine interface which forms an input and display interface of the laser leveling device and is connected with the MCU.

According to a possible embodiment, the MCU is further configured to send out a warning message when the temperature of the environment in which the device is located or the temperature inside the device exceeds a temperature limit.

According to a possible embodiment, the temperature is sensed by a temperature sensor connected to the MCU or by the build in function of the MCU.

According to a possible embodiment, the temperature limit of the environment in which the device is located is about −20° C. to 70° C.

According to a possible embodiment, the MCU is further configured to send out a warning message when the operation time of the laser leveling device reaches a regular checkup time.

According to a possible embodiment, the regular checkup time comprises a fixed time period or/and a permitted total working time from the latest periodical accuracy calibration of the laser leveling device.

According to a possible embodiment, the laser leveling device further comprise a connectivity module for establishing communication between the MCU and a smartphone with APP implementation for the laser leveling device.

According to a possible embodiment, the MCU is configured to send out the warning message when the magnitude a shock sensed by the shock sensor exceeds the shock threshold via the human machine interface of the laser leveling device and/or via the smartphone.

According to a possible embodiment, the operation time of the laser leveling device is tracked by the build in function of the MCU or by the smartphone.

According to a possible embodiment, the MCU is further configured to be used to report the accuracy of the laser leveling device via the HMI of the laser leveling device and/or via the smartphone.

According to a possible embodiment, the warning message includes a suggestion on checking the accuracy of the laser leveling device, stopping the operation of the laser leveling device or reducing the operation power of the laser leveling device.

According to a possible embodiment, the laser leveling device of claim further comprises a user manual for guiding the user to check the accuracy of the laser leveling device.

According to the disclosure, the pendulum-based laser leveling device can provide the user with details to warn the user to pay attention to the accuracy of the device, especially when the device has experienced a high impact. In addition, in further embodiments, information about extreme working conditions, like extreme temperatures, which affect the precision of the device, may also be provided to the user in details. Further, connectivity functionality for smartphone APPs may provide the user with the possibility of performing convenient after-treatments, including calibration, to the device.

BRIEF DESCRIPTION OF THE DRAWINGS

The above and other aspects of the disclosure will be understood and appreciated more completely by reading the detailed description below with reference to the drawings in which.

DETAILED DESCRIPTION

Some possible embodiments of the disclosure will be described now.

Figure 1:
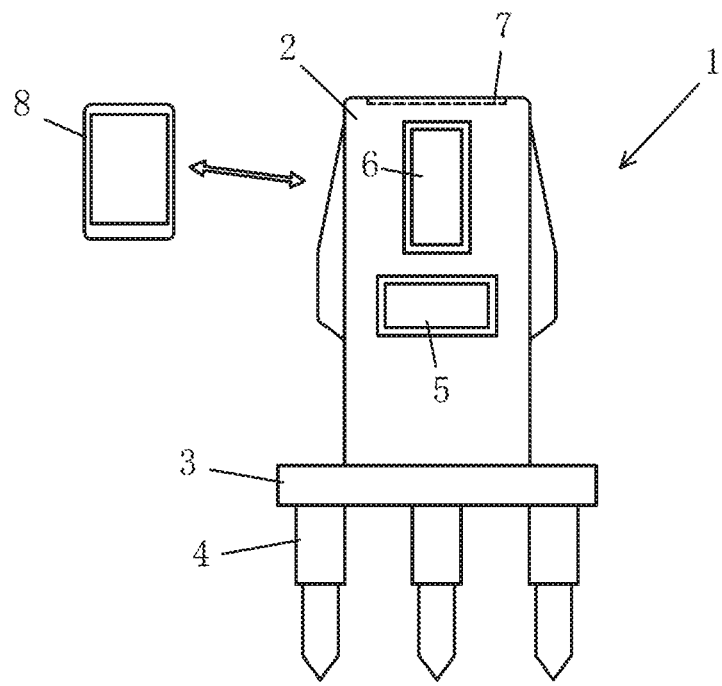
FIG. 1 is a schematic front view of a pendulum-based laser leveling device according to a possible embodiment of the disclosure.

With reference to FIG. 1, a laser leveling device 1 of the disclosure comprises a casing 2, a pendulum (not shown) universally suspended in the casing 2, and laser diodes (not shown in FIG. 1, labeled as "11" in FIG. 2) carried by the pendulum for generating the laser planes. The casing 2 may be removably supported by an optional seat 3. The seat 3 comprises adjustable legs 4 for adjusting the orientation of the seat 3 and the casing 2.

The casing 2 comprises a horizontal laser beam window 5 through which a horizontal laser plane can be emitted out, and one or more vertical laser beam windows 6 through which vertical laser planes can be emitted out. Laser lines are generated on objective surfaces when the laser planes are projected onto these surfaces.

A human machine interface (HMI) 7 is assembled to the casing 2. In the FIG. 1, the HMI 7 is provided in the top portion of the casing 2. The top portion is substantially horizontal in most operations and faces upwards, so the user can look at and touch it easily. A user can input instructions via the HMI 7. The HMI 7 includes a display, for example, an LED screen, for displaying information of the laser leveling device 1.

The laser leveling device 1 is in communication with a smartphone 8 with APP implementation for the laser leveling device 1.

Figure 2:
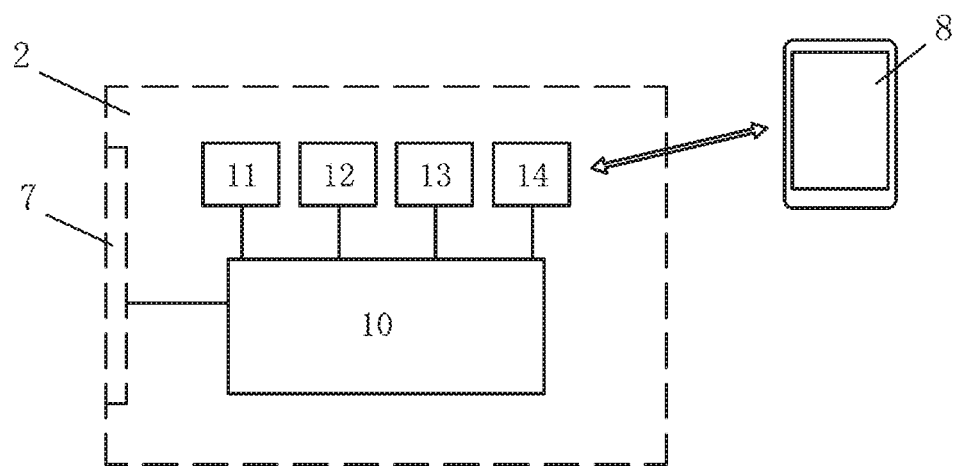
FIG. 2 is a block diagram of a controller unit of the laser leveling device shown in FIG. 1.

As shown in FIG. 2, inside the casing 2, the laser leveling device 1 comprises a micro controller unit (MCU) 10 for controlling the operation of it. The MCU 10 is connected with the laser diodes 11 which are used for generating the laser planes, a battery 12 for powering the laser leveling device 1, an shock sensor 13 for sensing impacts that the laser leveling device 1 has experienced, and a connectivity module 14 for establishing communication with the smartphone 8 so that information from the laser leveling device 1 can be transmitted to the smartphone 8 and displaced on the screen of the smartphone 8. The MCU 10 is also connected with the HMI 7.

The connectivity module 14 is preferably wireless connectivity module, for example, Bluetooth, WiFi, GSM/CDMA or Infra-Red module or the like.

The shock sensor 13 may be a MEMS shock sensor, a piezo shock sensor or the like. The shock sensor 13 is mounted inside the casing 2 so that any shock subjected by the laser leveling device 1 can be sensed by the shock sensor 13. The shock sensor 13 may comprise one or more shock sensors. For example, one three-axis shock sensor, or three single-axis shock sensors with their axes being oriented to be perpendicular to each other, may be used for sensing impacts in any direction. A combination of two axis shock sensor and one single-axis shock sensor may also be used for the same function. Other types and numbers of shock sensors or the combinations of them are also contemplated.

The MCU 10 provides a calibration guard function to warn the user when the magnitude of a shock sensed by the shock sensor 13 exceeds a shock threshold (determined as high impact) so that the user can check the accuracy of the laser leveling device 1 and, if necessary, to perform calibration to the laser leveling device 1. This function is available while the device is being used or when the device is turned off for a period of time.

The MCU 10 warns the user about an extreme storage temperature. A permitted storage temperature range, for example, −20° C. to 70° C. is stored in the MCU 10 or separate memory IC such as EEPROM. Temperature sensing can be achieved by external temperature sensing devices, such as thermal couple, thermistor or temperature sensing IC or by the build in function of the MCU 10. When the device is not used, or during storage, if the temperature of the environment where in the vice is located sensed by the MCU 10 is beyond the permitted storage temperature range, at the next startup of the device, the MCU warns the user about the extreme storage temperature conditions and advice the user to check the calibration of the device.

The MCU 10 also warns the user about an internal temperature of the device. A permitted internal temperature range is stored in the MCU 10 or separate memory IC such as EEPROM. Temperature sensing can be achieved by external temperature sensing devices, such as thermal couple, thermistor or temperature sensing IC or by the build in function of the MCU 10. When the internal temperature of the device sensed by the MCU 10 is beyond the permitted internal temperature range, especially when the internal temperature becomes equal to or higher than a permitted highest internal temperature, the MCU 10 warns the user about the internal temperature.

Temperature warning may happen after the laser leveling device 1 is just turn on when the internal temperature of the laser leveling device 1 is substantially equal to the ambient temperature, so the user can be warned that the ambient temperature is too low or too high that is no suitable for using the laser leveling device 1 there, and then the user may decide that he will not use the laser leveling device 1 there.

Alternatively, temperature warning may happen after the laser leveling device 1 continuously works for a certain time. For example, as heat generated by the laser diodes 11 is accumulated inside the casing 2, the internal temperature of the laser leveling device 1 may become very high. When the MCU 10 detects that the internal temperature exceeds the highest temperature limit, it will warn the user to stop the operation of the laser leveling device 1 (to turn off the whole laser leveling device 1 or turn off some or all of the laser diodes 11) or to reduce the operation power of laser leveling device 1 (for example, reducing the operation power of some or all of the laser diodes 11 and/or other components) so that the device may be cooled down. The operation stopping action can be done via the power switch of the laser leveling device 1, via a key on the HMI 7, or via a special keystroke of the smartphone APP.

Further, as is known, the laser leveling device 1 shall be calibrated periodically to ensure its accuracy, so the laser leveling device 1 may be set to have a regular checkup time. When it reaches the regular checkup time, the MCU 10 will warn the user to check the accuracy of the laser leveling device 1. The regular checkup time may comprise a fixed time period, for example, one year, from the latest periodical calibration of the laser leveling device 1. Time tracking can be achieved by the build in function of the MCU 10, or be performed by the smartphone 8. Alternatively or additionally, regular checkup time may comprise a permitted total working time, for example, several hundred hours, from the latest periodical calibration of the laser leveling device 1. In each operation, the MCU 10 can track the working time and record the accumulated working time. When the MCU 10 detects that the accumulated working time reaches the permitted total working time, it warns the user about this information so that the user can initiate accuracy checking of the laser leveling device 1.

Other types of states, that need to be monitored, of the laser leveling device 1 may additionally be detected, possibly by means of corresponding sensors or by the MCU 10 itself, and reported to the user.

The MCU 10 reports the information about the laser leveling device 1 to the user via the display of the HMI 7 and/or via the screen of the smartphone 8. The information contains setting parameters, operation parameters (including continuous working hours and accumulated working hours), abnormal conditions (like strong impact, extreme temperature, etc.), and other useful information.

When any condition that is monitored shall be reported to the user, the MCU 10 initiates the warning. Warning message may be displayed on the display of the HMI 7, or be a pop-up message on the screen of the smartphone 8, or even be flashing of the laser diodes 11. Then, the user may determine on what to do to the laser leveling device 1. For example, if extreme temperature and/or over working time is warned, he may stop the operation of the laser leveling device 1 or reduce the operation power of it for a certain time. Then he may turn on the laser leveling device 1 again. If he is not sure about the accuracy of the device, he may check the accuracy according to a user manual. The user manual may be stored in the MCU 10 or/and in the smartphone 8 and can be displayed to the user via the display of the HMI 7 and/or via the screen of the smartphone 8.

Checking the accuracy of the laser leveling device 1 may be set to be a function of the laser leveling device 1. That is to say, the MCU 10 may be configured to check the current accuracy of the laser leveling device 1. The accuracy may also be reported via the HMI 7 and/or the smartphone 8

After accuracy checking, if the user or the laser leveling device 1 judges that the accuracy meets the operation requirement, he may use the laser leveling device 1 to work. Now, if the warning message is still active, he may turn off the warning message via the HMI 7 or the smartphone 8.

On the other hand, if the user or the laser leveling device 1 judges that the accuracy does not meet the operation requirement, he may decide to perform calibration to the device. Calibration can be done by the user himself under the direction of the user manual, or be done in a service station.

Figure 3:
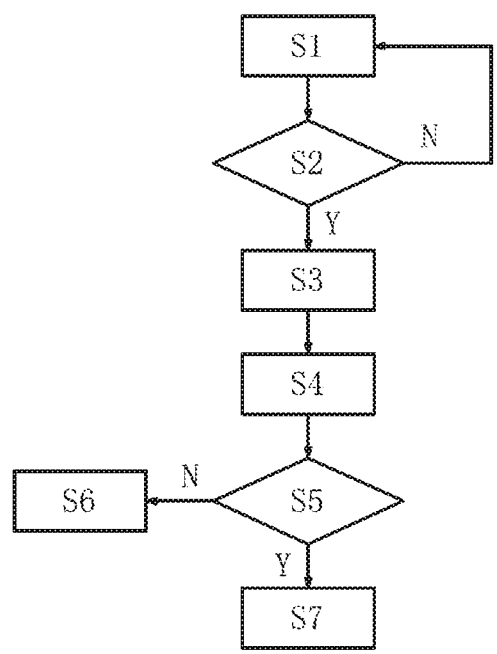
FIG. 3 is a flow chart showing a control program for calibration guard conducted in the controller unit shown in FIG. 2.

FIG. 3 shows by a simplified flow chart a calibration guard program that can be performed in the MCU 10 (with the intervention of the user), which comprises the steps described below.

In step S1, the operation state of the laser leveling device 1 is monitored. In this step, the MCU 10 monitors at least: any shock the laser leveling device 1 experienced, the storage temperature (or environmental temperature) of the laser leveling device 1, and the tracked working time. The shock, the temperature and the working time can be reported to the user.

Then, in step S2, the MCU 10 judges whether the device is in a state that needs to be reported to the user. Such a state means that at least one or more of the following events is sensed: the laser leveling device 1 has experienced a high shock, the sensed storage temperature exceeds the permitted storage temperature range which is stored in the MCU 10, and the regular checkup time is reached. If the judge result is NO (that is to say, there is no such event), then the program goes to step S7, and if the judge result is YES (that is to say, there is one of these events), the program goes to step S3.

In step S3, the event is reported via the HMI 7 and/or via the smartphone 8 and a massage if sent out to the user suggest that the accuracy of the device needs to be checked.

Then, in step S4, the user checks the accuracy of the laser leveling device 1 according to a user manual. Then, the program goes to step S5.

In step S5, the user judges whether the accuracy meets requirement. If the judge result is NO (that is to say, the laser leveling device 1 cannot operate properly), then the program goes to step S6, and if the judge result is YES (that is to say, the laser leveling device 1 can operate properly), the program goes to step S7.

In step S6, the laser leveling device 1 is calibrated. The warning message, if still active after calibration, may be turned off by the user by means of the HMI 7 and/or the smartphone 8. Then, the program goes to step S7.

In step S7, the laser leveling device 1 is used to work by the user.

Then, in step S8, the MCU 10 monitors any shock the laser leveling device 1 experienced, the internal temperature inside the laser leveling device 1, and the tracked working time.

Then, in step S9, the MCU 10 judges whether the laser leveling device 1 has experienced a high shock, whether the sensed internal temperature exceeds the permitted internal temperature range, and whether the tracked working time reaches the regular checkup time. If any one of these events is sensed, the user is warned to take a corresponding action.

According to the disclosure, when the pendulum-based laser leveling device is started up before use, the device can report to the user with details (high shock, extreme storage temperature and over working time) to warn the user that the accuracy of the device needs to be checked, and the device can also provide the user with similar warning during operation. Further, connectivity functionality for smartphone APPs provides the user with the possibility of conducting convenient after-treatments, including calibration, to the device.

While the disclosure has been shown and described in relation to certain embodiments, the disclosure is not intended to be limited to the illustrated details. Rather, various details of the disclosure can be modified within the scope of the claims and their equivalents.

The invention claimed is:

1. A laser leveling device (1) comprising:
a shock sensor (13) for sensing a shock experienced by the laser leveling device (1); and
a micro controller unit (MCU, 10) connected to the shock sensor (13);
wherein the MCU (10) is configured to send out a warning message when the magnitude of the shock sensed by the shock sensor (13) exceeds a shock threshold.

2. The laser leveling device of claim 1, wherein the MCU (10) is further configured to send out a warning message when the temperature of the environment in which the device is located or the temperature inside the device exceeds a temperature limit.

3. The laser leveling device of claim 2, wherein the temperature is sensed by a temperature sensor connected to the MCU (10) or by the build in function of the MCU (10).

4. The laser leveling device of claim 2, wherein the temperature limit of the environment in which the device is located is about −20° C. to 70° C.

5. The laser leveling device of claim 1, wherein the MCU (10) is further configured to send out a warning message when the operation time of the laser leveling device reaches a regular checkup time.

6. The laser leveling device of claim 5, wherein the regular checkup time comprises a fixed time period or/and a permitted total working time from the latest periodical accuracy calibration of the laser leveling device (1).

7. The laser leveling device of claim 1, further comprising a connectivity module (14) for establishing communication between the MCU (10) and a smartphone (8) with APP implementation for the laser leveling device (1).

8. The laser leveling device of claim 1, wherein the MCU (10) is configured to send out the warning message when the magnitude of the shock sensed by the shock sensor (13) exceeds the shock threshold via a human machine interface (7) of the laser leveling device and/or via the smartphone (8).

9. The laser leveling device of claim 5, wherein the operation time of the laser leveling device is tracked by the build in function of the MCU (10) or by the smartphone.

10. The laser leveling device of claim 1, wherein the MCU (10) is further configured to be used to report the accuracy of the laser leveling device via the HMI (7) of the laser leveling device and/or via the smartphone (8).

11. The laser leveling device of claim 1, wherein the warning message includes a suggestion on checking the accuracy of the laser leveling device, stopping the operation of the laser leveling device (1) or reducing the operation power of the laser leveling device (1).

12. The laser leveling device of claim 11, further comprising a user manual for guiding the user to check the accuracy of the laser leveling device.

* * * * *